July 31, 1945. W. R. WALKER 2,380,811
SEALED ENCLOSURE AND METHOD OF SEALING SAME
Filed June 7, 1943
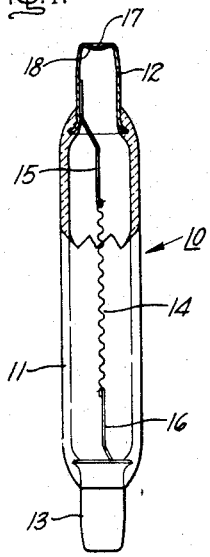
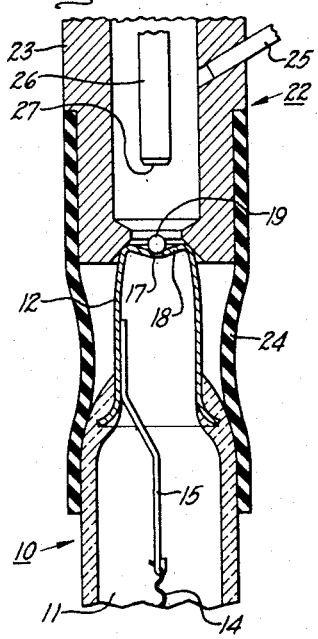
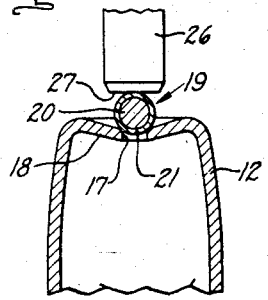
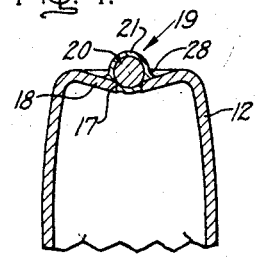
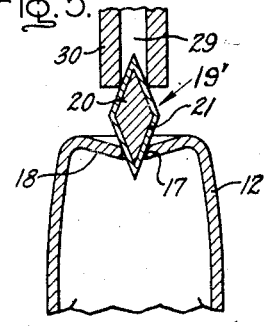
Inventor:
Warren R. Walker,
by John H. Anderson
His Attorney.

Patented July 31, 1945

2,380,811

UNITED STATES PATENT OFFICE 2,380,811

SEALED ENCLOSURE AND METHOD OF SEALING SAME

Warren R. Walker, Forest Hills, N. Y., assignor to General Electric Company, a corporation of New York Application June 7, 1943, Serial No. 489,932

3 Claims. (Cl. 316—18)

My invention relates, in general, to hermetically sealed receptacles constituted at least partly of thin metal wall portions, and to the art of sealing such receptacles. More particularly, my invention relates to a method of sealing receptacles.

It has been proposed heretofore to hermetically seal a receptacle or container by welding a body of difficultly fusible metal into an aperture in a thin metal wall portion of the receptacle, the welding being accomplished in such a way as to avoid burning of the metal or bending of the receptacle wall. Such a sealing method is disclosed in U. S. Patent No. 2,141,932, issued December 27, 1938, to J. H. Payne, wherein a ball of difficultly fusible metal is positioned in a receptacle aperture to be sealed so that a relatively extensive contact area exists between the receptacle and ball, after which the ball is fused to the receptacle over the aperture therein by the passage of a welding current through the ball and receptacle simultaneously with the exertion of pressure therebetween.

While such a sealing method produces an effective seal, it is more or less difficult to adjust the welding conditions so that sufficient fusion is obtained to produce an effective seal without the sealing ball being pushed through the thin metal wall of the receptacle due to overheating and resultant softening of the wall around the aperture therein. It is an object of the present invention to obviate such difficulty and to provide a simple and effective method of hermetically sealing a receptacle or vessel constituted at least partly of a thin metal wall.

A feature of the invention is the use of a closure element in the form of a slug or ball made of steel or other difficultly fusible metal and provided with a coating or plating of a more readily fusible metal or metal alloy such as copper, for instance, the metal ball or slug being positioned over a slightly smaller aperture in a metal wall of the receptacle and a welding current then being passed through the said ball or slug to fuse only the metal plating thereon whereby overheating of those portions of the receptacle wall around the aperture therein, with consequent pushing of the ball or slug through the aperture, is avoided.

Further objects and advantages of my invention will appear from the following description of a species thereof and from the accompanying drawing, in which:

Fig. 1 is a longitudinal section on an enlarged scale of an electric incandescent lamp of a type to which the invention is particularly applicable, the lamp being shown prior to the hermetic sealing thereof; Figs. 2 and 3 illustrate successive steps in the practice of the invention; Fig. 4 is a fragmentary sectional view showing the completed seal comprising my invention; and Fig. 5 is a fragmentary sectional view showing an alternative mode of application of my invention.

The nature of my invention may best be understood by considering its application to a particular use such as sealing an electric incandescent lamp of the type shown in Fig. 1, the invention being of special utility in the manufacture of such type lamps. Referring to Fig. 1, the lamp there shown is of the double-ended type disclosed and claimed in U. S. Patent No. 2,191,346, issued February 20, 1940, to A. Greiner, and comprises a container or envelope 10 consisting of a double-ended glass bulb or tube 11 having a pair of end contact or closure members 12, 13 sealed by fusion to the opposite ends thereof. The end closure or terminal members 12, 13 may be of thimble or cup-shaped form and are preferably made of a chrome-iron alloy or some other suitable metal having a co-efficient of expansion approximating that of the glass used for the bulb 11. The bulb may be sealed by fusion to the metal thimbles in the manner disclosed in U. S. Patent No. 2,221,868, issued November 19, 1940, to W. J. Geiger et al. Disposed within the container or envelope 10 is a filament 14 of tungsten or other suitable refractory metal and preferably extending longitudinally of the container. The said filament 14 is supported in place within the container or envelope 10 by means of support or lead-in wires 15, 16 spot welded to the opposite end closure or contact members 12, 13 and connected to opposite ends of the filament 14. Thimble 12 is provided with a small orifice or aperture 17 located at the bottom of a depression formed by the inwardly bent end wall 18 of the said thimble. Evacuation of the envelope 10 and, if desired, gas charging thereof, is effected through the said aperture 17 after which the aperture is sealed or closed so as to render the envelope gas-tight.

In accordance with the invention, the sealing of the envelope 10 is accomplished by positioning a metal closure member or pellet 19 (Fig. 2) within the depression formed in the end wall 18 of thimble 12 so that it coincides with and covers the aperture 17 therein, and then welding the closure member to the said end wall. The said closure member or element 19 is preferably of spherical contour and is of slightly larger diameter than the aperture 17 so that it will not pass therethrough into the envelope 10. In accordance with the invention, the closure element 19 is formed of an inner core 20 of a difficultly fusible (high melting point) metal provided with a thin coating or plating 21 of a more readily fusible or lower melting point metal.

The inner core or support 20 of the closure element 19 is made of a metal having a relatively high melting point on the order of that of the metal wall 18 to which the closure element is to be sealed. Steel is preferably employed for the inner core 20 of the closure element, although chrome-iron alloys and nickel are also suitable for such purpose. The inner core 20 of the closure element 19 may be conveniently constituted by a steel ball of the type such as is commercially used for ball bearings.

The metal coating or plating 21 on the inner core or ball 20 of the closure element 19 is of a metal which is more readily fusible than the metals of the inner core 20 and the envelope wall 18 to which the closure element is to be sealed. The coating or plating metal 21 also should be one that will satisfactorily adhere to or plate onto the inner core 20. Copper is preferably employed as the coating metal 21 where steel is used for the inner core 20. A copper coating .001 inch in thickness on a steel ball having a diameter of .062 inch has been found to be satisfactory for the purposes of this invention.

In order to evacuate the envelope 10 and weld a closure element 19 in place on the metal wall 18 over the aperture 17 therein so as to hermetically seal the envelope, a combination exhaust chamber and welding assembly or head 22 is first brought into operative relation to the apertured thimble 12 and the adjacent portions of the lamp envelope 10, as shown in Fig. 2. The said assembly 22 may, for example, form a part of the sealing machine disclosed in U. S. Patent No. 2,101,156, issued December 7, 1937, to J. H. Payne. As shown in Fig. 2, the assembly 22 comprises a stationary hollow electrode 23 which contacts with the outer surface of the metal thimble 12. In order to render the joint between the electrode 23 and the thimble 12 substantially gas-tight, a flexible tube 24 of rubber or other resilient material is provided on the end of the electrode, the said tube fitting tightly around the electrode end and around the bulb 11 of the lamp envelope 10. As a result of this gas-tight connection, a desired condition of vacuum or gas pressure may be established within the envelope 10 before it is sealed, such vacuum or gas pressure being effected through the hollow electrode 23. In the case of electric incandescent lamps of the type under consideration, the lamp envelope 10 is preferably more or less completely evacuated. In order to permit closure elements 19 to be fed into place after the desired vacuum or gas pressure is created within the container 10, a tube 25 is provided which passes laterally through the wall of the electrode 23.

Co-operating with the stationary electrode 23 is a movable electrode 26 arranged concentrically within the former. The lower end or surface 27 of the movable electrode 26 is flattened and is adapted to contact the closure element 19. During the welding operation, the contact pressure between these two elements is very slight, being provided, for example, by the weight of the movable electrode 26 alone or by the weight of the said electrode assisted by a weak compression spring.

After the evacuation of the lamp envelope 10 and the positioning of a closure element 19 on the metal thimble 12 over the aperture 17 therein, the movable electrode 26 is moved down into contact with the closure element 19 (as shown in Fig. 3) and an impulse of high-amperage welding current then passed serially through the electrode 26, the closure element 19 and the thimble end wall 18, whence it returns to the co-operating welding electrode 23. The welding current passing through the closure element 19 heats the same so as to fuse the low-melting point metal coating 21 thereon which then flows down onto and integrally unites with the metal of the wall 18 around the aperture 17 therein, as shown at 28 in Fig. 5, to thereby form a gas-tight seal.

Because of the coating 21 of lower melting-point metal on the closure element 19, it is only necessary to pass a welding current through the closure element which is just sufficient to fuse the said coating 21. Since the fusion point of the metal coating 21 is lower than that of the metal wall 18 of the envelope 10, it is therefore unnecessary to heat the closure element 19 to such an extent as might cause the envelope wall 18 to become softened and deformed by the said closure element and the closure element to be pushed clear through the aperture 17. As a result, my invention provides a very simple and effective method of sealing a closure element in place over an aperture in a thin metal wall, and eliminates the need for overly critical control of the welding current employed.

While I have described my invention as being preferably applied in connection with a spherical closure element, it is not necessarily limited thereto. Thus, in Fig. 5 I have illustrated a modification of the invention in which the closure element or pellet 19' is of essentially rhombic cross-section having one apex positioned in the seal-off aperture 17 and the other apex positioned in a relatively small opening 29 provided for that purpose in the lower face or end of a welding electrode 30.

What I claim as new and desire to secure by Letters Patent of the United States is:

1. An electric lamp comprising an evacuated glass envelope having an end wall of sheet chrome-iron with an exhaust aperture therein, and closure means consisting of a copper coated steel pellet slightly larger than the said aperture, said pellet being fitted in said aperture and a portion of its copper coating being fused to the periphery of said aperture.

2. An electric lamp comprising an evacuated glass envelope having an end wall of sheet metal with an exhaust aperture therein, and closure means consisting of a metal pellet slightly larger than said aperture and having thereon a metallic coating, the said coating being of metal having a melting point of the order of that of copper but below the melting point of the said end wall or pellet, the said pellet being fitted in said aperture and a portion of its coating metal being fused to the periphery of said aperture.

3. In the manufacture of electric lamps comprising a glass envelope having an end wall of sheet metal with an exhaust aperture therein, the steps which comprise evacuating the envelope through said aperture, fitting in said aperture a coated metal pellet slightly larger than the aperture and provided with a coating of metal having a melting point of the order of that of copper but below the melting point of the said end wall or pellet, and then passing serially through the coated pellet and the end wall an electric current sufficient to fuse the coating metal to thereby seal the aperture.

WARREN R. WALKER.